Figure 1:
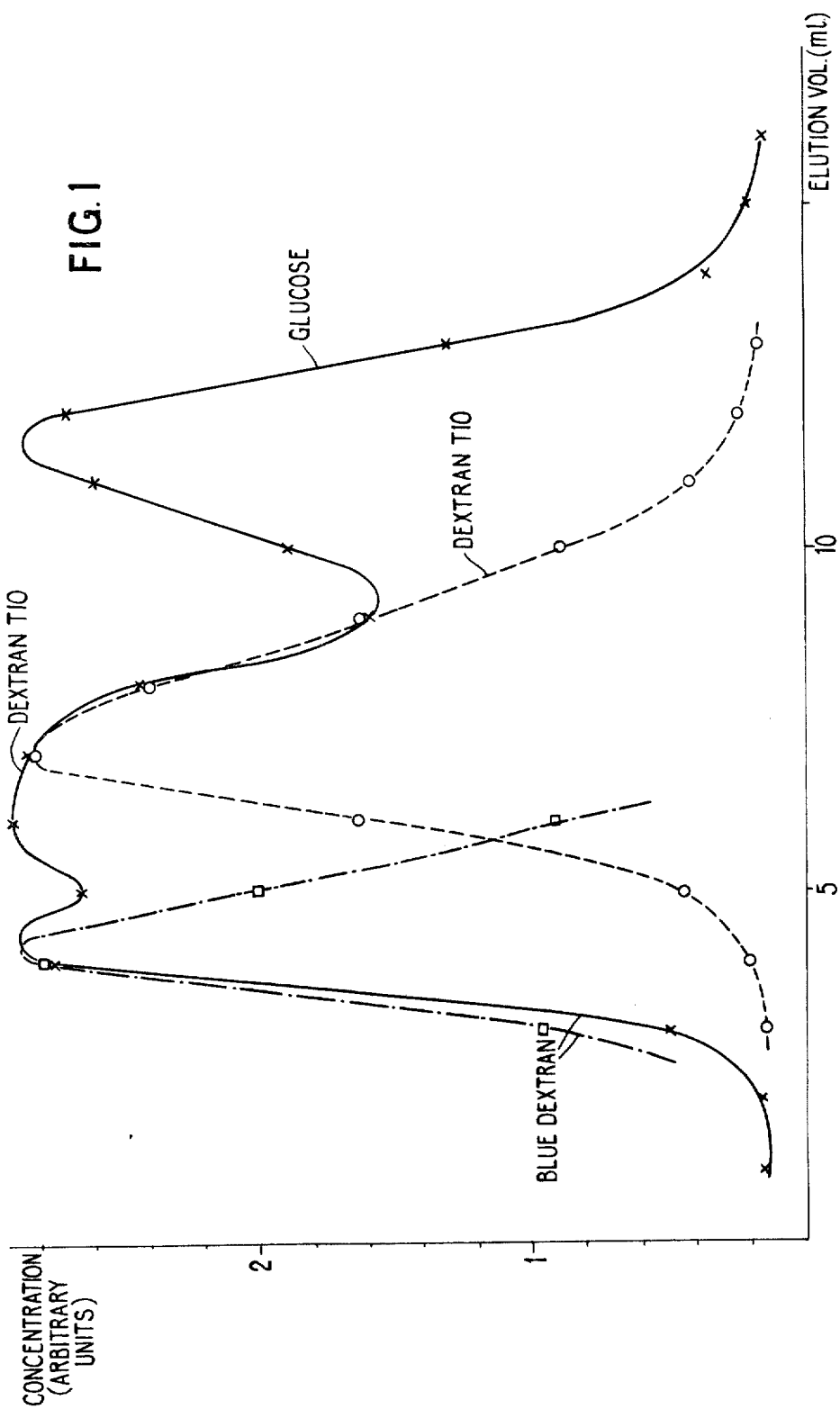

United States Patent [19]

Epton et al.

[11] 3,896,092

[45] July 22, 1975

[54] MATERIAL FOR GEL PERMEATION CHROMATOGRAPHY

[76] Inventors: Roger Epton, 22 Winchester Rise, Dudley, Worcestershire; Christopher Holloway, 12 Leicester Close, Smethwick, Worley, Worcestershire; John Vincent McLaren, 35 York Ave., Finchfield, Wolverhampton, Staffordshire, all of England

[22] Filed: Sept. 15, 1972

[21] Appl. No.: 289,461

[30] Foreign Application Priority Data
Sept. 15, 1971  United Kingdom............... 43093/71

[52] U.S. Cl. ...... 260/80.3 N; 260/2.5 R; 260/80 P; 260/80.3 E; 260/80.3 R; 260/89.7 R; 260/89.7 S; 260/91.7; 55/386; 195/63; 195/66 R; 195/68; 195/103.5 R; 195/DIG. 11; 210/198 C
[51] Int. Cl. ........................................... C08f 19/00
[58] Field of Search ..... 260/80.3 N, 80.3 E, 80.3 R, 260/89.7 S, 91.7, 80 P

[56] References Cited
UNITED STATES PATENTS

| | | | |
|---|---|---|---|
| 2,631,995 | 3/1953 | Bruson | 260/79.3 |
| 2,632,757 | 3/1953 | Reynolds et al. | 260/79.3 |
| 2,649,438 | 8/1953 | Bruson | 260/85.5 |
| 2,798,061 | 7/1957 | Coover et al. | 260/45.5 |

*Primary Examiner*—Stanford M. Levin

[57] ABSTRACT

The invention discloses cross-linked polymers which are useful for the separation of discrete chemical compounds by gel permeation chromatography. At least some of the repeating units of the backbone chains of the cross-linked polymers are bonded directly or indirectly to morpholine groups. The polymers have the advantage that they form gels in both water and a wide range of organic solvents.

5 Claims, 8 Drawing Figures

MATERIAL FOR GEL PERMEATION CHROMATOGRAPHY

BACKGROUND TO THE INVENTION

This invention relates to polymers which are useful for the separation of discrete chemical compounds by gel permeation chromatography.

Gel permeation chromatography can be applied wherever substances of different molecular weight have to be separated. Separation is based on differences in molecular size and can thus be used for separating a wide range of substances including viruses, proteins, antibiotics and synthetic polymers.

Materials which can be used as the stationary phase in gel permeation chromatography are porous to the moving phase, but have lower and varying degrees of porosity to chemical compounds of differing size and shape. As the mixture is eluted, compounds are retarded to an extent depending on their ability to penetrate the stationary phase. Small molecules penetrate the pores of stationary phase more easily than large ones and are thus retarded to a greater extent than the larger molecules.

There are three types of gel, Aerogels, Xerogels and Xerogel-aerogel hybrids all of which can be used in gel permeation chromatography with varying degrees of success. Aerogels, such as, for example, porous glass, and certain polystyrenes, retain or nearly retain, their physical dimensions whether solvent is present or not. Xerogels, such as, for example, cross-linked dextran, and cross-linked polyacrylamide, swell in the presence of suitable solvents, but collapse on their removal. Xerogel-aerogel hybrids have a semi-rigid structure and swell only slightly or not at all in solvents.

With Aerogels one can usually use a wide variety of solvents. Xerogels on the other hand, can only be used with a much smaller number of solvents because they remain unswollen in solvents for which they have little affinity. Unfortunately, aerogels admit much less of the mobile phase than xerogels and therefore aerogel columns, and the volumes of eluent involved, must be much larger than for a xerogel to achieve the same separation results. The disadvantage of xerogels, however, is their inability apart from a few exceptions, to swell in both water and a wide range of organic solvents.

It is therefore an object of this invention to provide a material which can be used as the chromedia in gel permeation chromatography and which will form a gel both in water and a wide range of organic solvents.

THE INVENTION

According to the invention there is provided a cross-linked polymer of which at least some of the repeating units of the backbone chains have morpholine groups covalently bonded through the nitrogen atom of the morpholine groups and directly or through divalent linking groups to the atoms constituting the backbone chains, sufficient cross-links existing between the backbone chains to make the polymer capable of forming a gel in water and in chloroform.

The cross-linked polymers according to the invention can be used as chromedia in gel permeation chromatography for analysing mixtures of compounds and for separating small molecules. The polymers have the advantage that they form gels in both water and a wide range of organic solvents including, for example, tetrahydrofuran and pyridine. Another important advantage, both in the preparation and subsequent use of the polymers, is that they do not readily swell in ethanol and methanol. Thus, addition of these alcohols to a suspension of the polymer in water or an organic solvent causes the polymer to shrink thereby facilitating recovery and drying.

A further advantage of the invention is that the polymers can be made to be completely free of hydroxyl groups and thus hydrogen bonding effects due to these groups can be substantially eliminated. This enables the polymers to act as true molecular sieves for a large number of compounds which would otherwise be adsorbed onto the polymers.

Preferably, the polymers of the invention contain morpholine groups that are covalently linked to the backbone chains through divalent organic radicals such as methylene bridges or carbonyl groups. Preferred polymers according to the invention may contain repeating units having one of the following formulae:

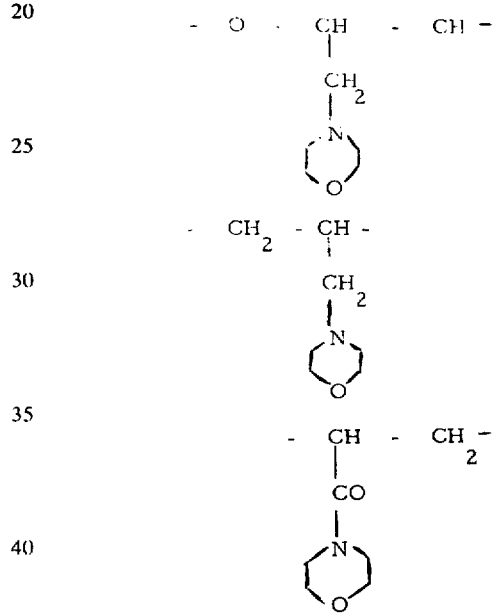

The polymers of the invention can be prepared in a number of ways. The first method comprises polymerising a polymerisable monomer containing morpholine groups covalently bonded to the polymerisable part of the monomer in the presence of a cross-linking agent. Suitable monomers are the acylaminomorpholines such as N-acryloylmorpholine, N-methacryloylmorpholine, ethacryloylmorpholine, propacryloyl-morpholine and chloroacryloyl morpholine. Other suitable monomers include 1, 2 epoxy-3-morpholine propane and allyl morpholine.

A second method of preparing the polymers of the invention comprises reacting a polymer with a compound containing morpholine groups and a cross-linking agent, such that the polymer becomes substituted with morpholine groups. Suitable polymers include poly (allyl halide) and poly (acryloyl chloride) and a suitable morpholine group containing compound is morpholine itself.

A third method of preparing the polymers of the invention comprises reacting a cross-linked polymer with a compound containing morpholine groups. Suitable crosslinked polymers include cross-linked polyacrylamide while a suitable morpholine group containing compound is morpholine itself. Such a reaction can be carried out by refluxing the cross-linked polyacrylamide with the morpholine as solvent, and results in the amide groups being substituted with morpholine groups.

The cross-linking agents for preparing the polymers of the invention are preferably those containing at least two ethylenically unsaturated groups and the particularly preferred cross-linking agents are N,N' methlenediacrylamide and diallyl ether.

One particularly preferred polymer can be prepared by copolymerization of N-acryloylmorpholine with N,N-methylenediacrylamide in aqueous solution, achieved by adding a catalyst such as potassium persulphate, and purging with nitrogen. The molar ratio of N-acryloylmorpholine to N,N' methylenediacry-lamide in the reaction can be varied from 150/1 to 5/1.

The preparation of the polymers in bead form can conveniently be effected by forming a suspension of the reactants in an aqueous solution in paraffin mixed with suitable surfactants. This procedure is particularly satisfactory for preparing polymers from acryloyl morpholine. The morpholine compound is mixed with a cross-linking agent such as N,N'methylenediacrylamide and dissolved in water. The mixture, preferably after degassing with an inert gas such as nitrogen, is mixed with a catalyst such as potassium persulphate. The mixture is then added to liquid paraffin mixed with a surfactant, and the whole stirred to produce a suspension in the paraffin. After polymerisation, the resulting beads can be washed and shrunk by addition of alcohol.

The pore size of the polymers of the invention can be varied in a number of ways to suit different applications of the polymers. A first method is to change the ratio of the monomers that are to be reacted.

The pore size can also be varied by macro-reticular polymerisation, that is polymerization in a medium which is a good solvent for the initial reactants but is a poor solvent for the chains of the resulting polymer of the invention, so that as the polymer chains are formed they agglomerate together resulting in larger pores. For example the polymerization can be carried out in water mixed with ethanol which is a non-solvent for the constituent chains of the polymer. The polymers prepared by this method are xerogel-aerogel hybrids and a suitable molar ratio of polymerizable monomers to cross-linking agent is from 150:1 to 1.5:1. In the case of macro-reticular polymerization employing polystyrene and divinylbenzene the optimum ratio is 3:1.

Another method of varying pore size is to vary the concentration of the reactants alone, providing that a ratio of morpholine group containing compound to cross-linker is chosen that ensures good mechanical stability. Such a ratio of morpholine containing compounds to cross-linker is 10/1. It has also been found that the rate of stirring of the reaction mixture can effect the bead size and it is therefore important to use the correct rate to obtain the desired size of bead.

An additional feature of the invention is that the mild conditions employed in the polymerization reaction enable the polymers according to the invention to be produced in which biologically active molecules, such as, for example, urease may be entrapped without the active molecules being destroyed. Such chromedia will have analytical and certain medical applications such as in enzyme chromatography and will be of use as catalysts in industrial biochemical reactors.

Another use of the chromedia of the invention is in desalting processes in which a mixture of the compounds to be desalted for example, a starch glucose mixture is passed through the chromatographic columns. Polymers produced in the invention can also be used to entrap catalytic water soluble enzymes in order to insolubilise the enzymes.

PREFERRED EMBODIMENTS OF THE INVENTION

The invention will now be illustrated with reference to the following examples:

Example 1

Preparation of copolymers of N-acryloylmorpholine (I) and N,N-methylenediacrylamide (II) of varying monomer ratio Aliquots (50 ml) of distilled water were dispensed in five polymerisation vessels. To each vessel potassium persulphate (5 mg) was added followed by N-acryloylmorpholine (I) and N,N'-methylenediacrylamide (II) in the quantities shown in Table 1. Nitrogen was bubbled through the solution. Gelation was apparent within 30 minutes. The gels were allowed to harden in the polymerisation flasks overnight. Their properties are summarized in Table 1.

Example 2

Polymerisation of N-acryloylmorpholine (I) and N,N'-methylenediacrylamide (II) in mixed solvents.

Aliquots (50 ml) of distilled water were dispensed in four polymerisation vessles. To each vessel potassium persulphate (10 mg) was added followed by N-acryloylmorpholine (35.25g, 0.25 mole) and N,N'-methylenediacrylamide (1.0 g, 0.0065 mole). Methanol (50 ml), dimethylformamide (50 ml), tetrahydrofuran (50 ml) and water (50 ml) were used to dilute each of the monomer solutions with a different solvent. Polymerisation was then effected as in the previous experiment. The properties of the polymers are summarized in Table 2.

TABLE 1

Physical nature of copolymers of N-acryloylmorpholine (I) and N,N'-methlenediacrylamide (II) in various monomer ratios

| | | | | | |
|---|---|---|---|---|---|
| Weight of I | 17.625g. (0.125 mole) | 17.625g. (0.125 mole) | 17.625g, (0.125 mole) | 17.625g. (0.125 mole) | 17.625g, (0.125 mole) |
| Weight of II | 0.1285g (0.0008 mole) | 0.33856g (0.0025 mole) | 0.964g (0.00625 mole) | 1.928g (0.0125 mole) | 3.856g (0.025 mole) |
| Molar ratio I/II | 150/1 | 50/1 | 20/1 | 10/1 | 5/1 |
| Physical form of polymer | rubbery slightly sticky (Coplymer A1) | soft rubbery brittle (Coplymer A2) | hard slightly rubbery brittle (Copolymer A3) | hard less brittle (Copolymer A4) | poor mechanical stability (Copolymer A5) |

TABLE 2

Physical nature of copolymers of N-acryloylmorpholine (I) and N,N'-methylenediacrylamide prepared in mixed solvents.

| Secondary Solvent Properties of gel | Methanol Hard Brittle | Dimethyl-formamide Slightly soft rubbery | Tetra hydrofuran Slightly soft rubbery | Water Hard slightly brittle |
| --- | --- | --- | --- | --- |

Example 3.

Preparation of copolymer of N-acryloylmorpholine (I) and N,N'-methylene-diacrylamide (II) in bead form: molar ratio I/II of 10/1 and water regain approximately 2.5 ml/g - (Copolymer C).

A two litre polymerisation flask, fitted with a single blade stirrer filling approximately the lower half of the flask, was filled with paraffin (1,750 ml, S.G.O.830 to 0.870) together with an aliquot (17.5 mls) of a mixture of Sorbitan Trioleate (18 ml) and Polyoxyethylene-Sorbitan Trioleate (0.4 ml). The solution was purged with nitrogen for 2 hours with slow stirring. A solution of acryloyl morpholine (123.3g 0.875 mole) and N,N'-methylenediacrylamide (13.50g, 0.0875 mole) and potassium persulphate (28 mg) in distilled water (350 ml) was then added. The solution was dispersed by a short burst of rapid stirring. Slow stirring was then maintained for 1 hour under nitrogen. After standing overnight to harden and settle, the beads were separated, washed several times with light petroleum (40° to 60°) followed by acetone and dried in vacuo. The beads were subsequently graded by sedimentation against an upward flow of water. Beads having diameters of 40 to 65 microns were obtained (Copolymer C).

Example 4.

Preparation of copolymer of N-acryloylmorpholine (I) and N,N'-methylenediacrylamide (II) in bead form: molar ratio I/II of 10/1 and water regain approximately 1.7 ml/g - (Copolymer D).

Copolymer D was prepared by a procedure similar to that used in Example 3, but using paraffin (1,000 ml, S.G. 0.830 to 0.870) containing an aliquot (20 ml) of a mixture of Sorbitan Trioleate (24 ml) and polyoxyethylene-sorbitan trioleate (3.6 ml) to disperse an aqueous solution (68 ml) containing acryloylmorpholine (31.6 ml, 0.25 mole), N,N'-methylenediacrylamide (3.8g, 0.025 mole), and potassium persulphate (40 mg).

Example 5.

Separation of species of different molecular weight by aqueous gel permeation chromatography using Copolymer C and Copolymer D.

Copolymers C and D were first equilibrated with distilled water, after which they were packed into chromatographic columns, C1 and D1 respectively each of length 30 cm, and diameter 0.9 cm. Using distilled water as eluent, chromatograms were run as follows:

Chromatogram 1

Blue dextran (0.33 percent), Dextran T.10 (0.33 percent) and glucose (0.33 percent) - (sample volume 0.2 ml) - were run on Column C1 collecting 1 ml fractions. Blue dextran was detected by absorbance at 260 nm, Dextran T10 and glucose by reaction of the eluent (0.5 ml) with aliquots (2.5 ml) of 86 percent sulphuric acid, containing 0.07 percent W/V cysteine hydrochloride, for 3 minutes at 100°C, and estimating the absorbance at 420 n.m. The results are presented in FIG. 1, in which curve A is a mixture of blue Dextran, Dextran T10 and glucose, curve B is blue Dextran alone and curve C is Dextran T10 alone.

Chromatogram 2

Figure 2:
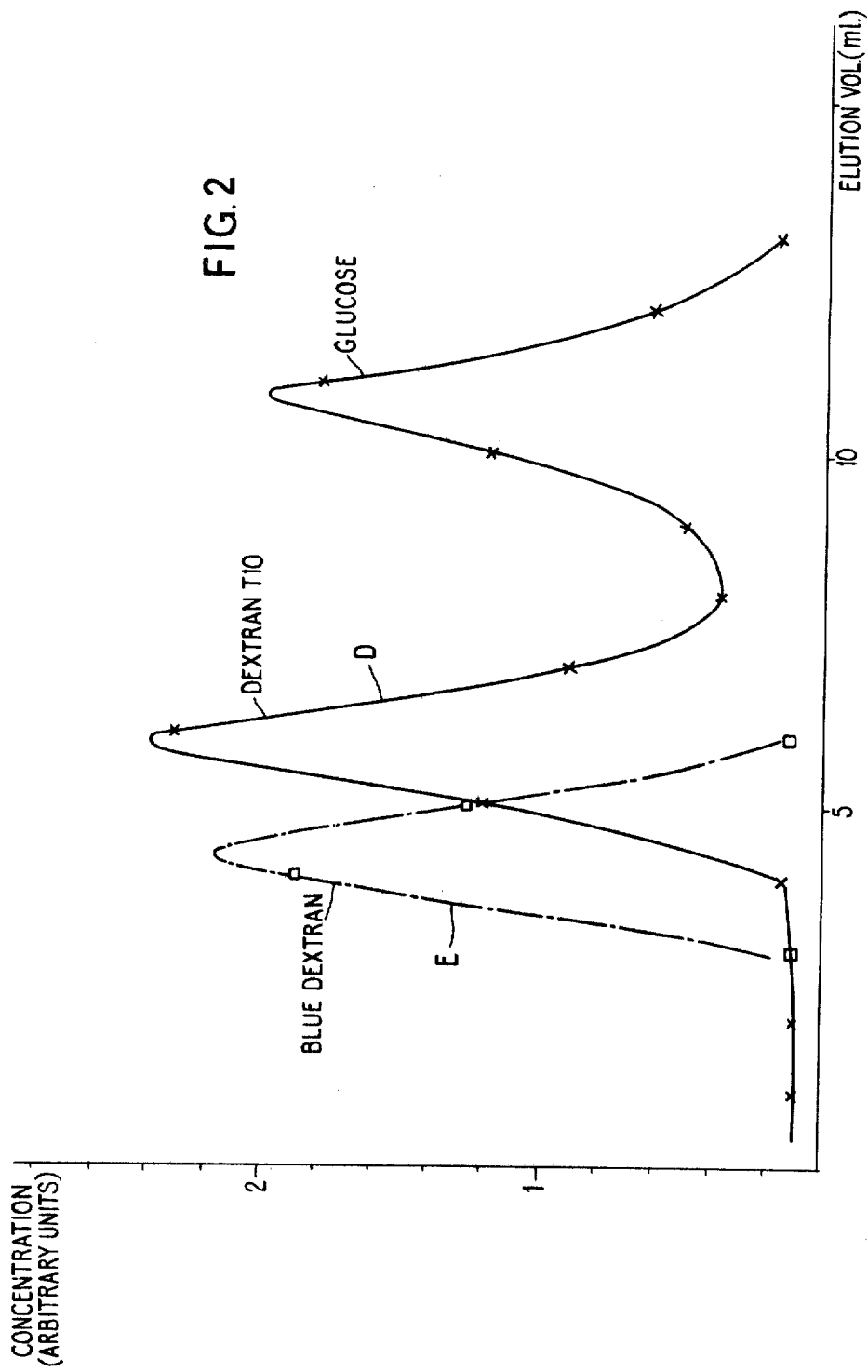

Dextran T10 (0.33 percent) and glucose (0.33 percent) (sample volume 0.2 ml) were run on Column D1 collecting 1 ml fractions. The results are presented in FIG. 2 in which curve D is a mixture of Dextran T10 and glucose.

Chromategram 3

Blue Dextran (0.33 percent) (sample volume 0.2 ml) was run on column D1 collecting 1 ml fractions. The result is presented in FIG. 2 in which curve E is blue Dextran.

Chromatogram 4

Figure 3:
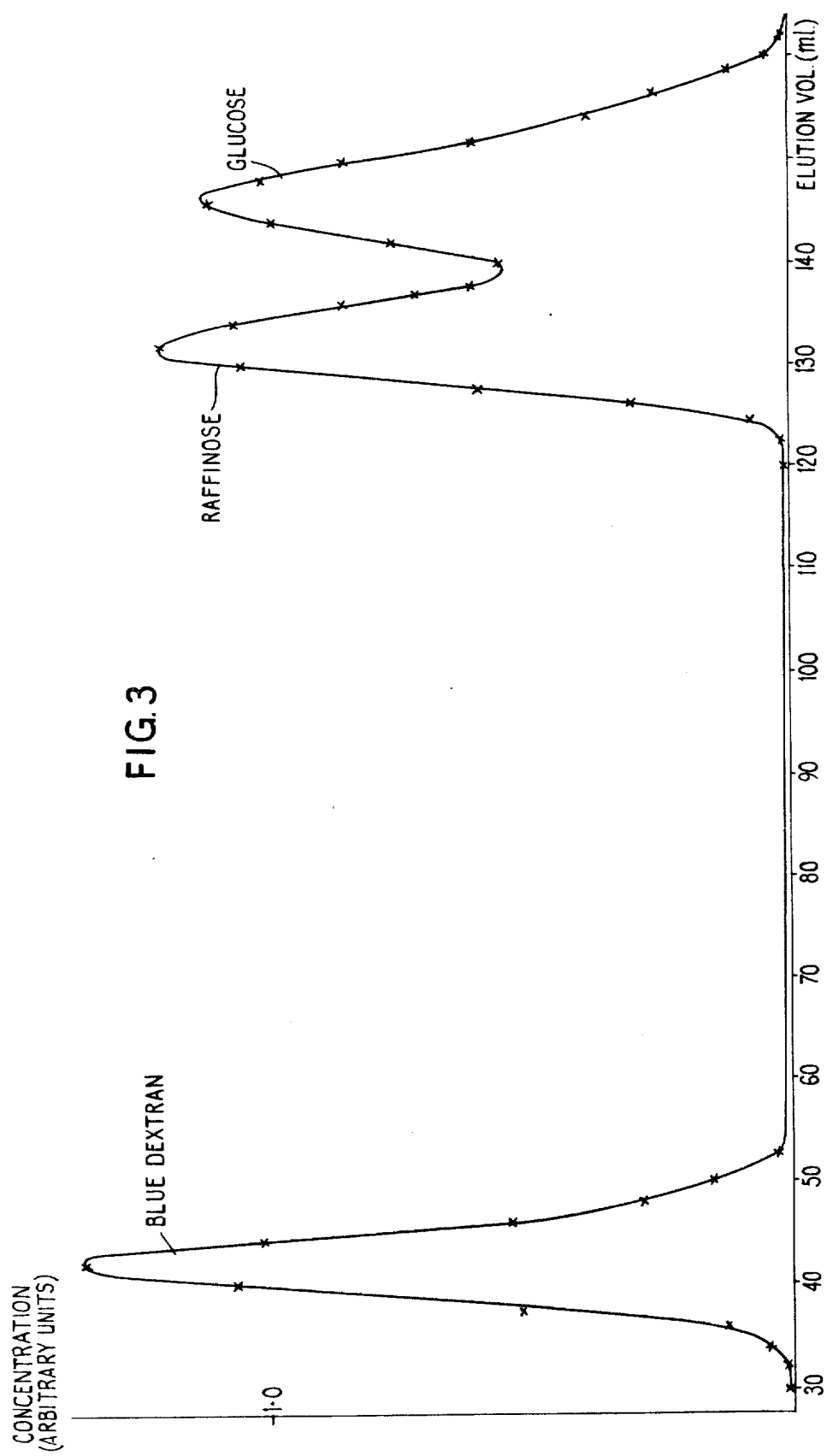

Copolymer C, following equilibration with distilled water, was packed into a column, C2, length 33 cm, diameter 2.5 cm. Using distilled water as eluant, a chromatogram was run as follows:

Blue Dextran (0.5 percent), raffinose (0.5 percent) and glucose (0.5 percent) (sample volume 1 ml) were run on Column C2 collecting 2 ml fractions. The results are presented in FIG. 3.

Example 6.

Separation of high molecular weight substances from low molecular weight substances by gel permeation chromatography in chloroform using Copolymer C.

Copolymer C was allowed to equilibrate with chloroform after which it was packed into a Column, C3, length 37 cm, and diameter 1 cm. Using chloroform as eluant a chromatogram was run as follows:

Chromatogram 5

Figure 4:
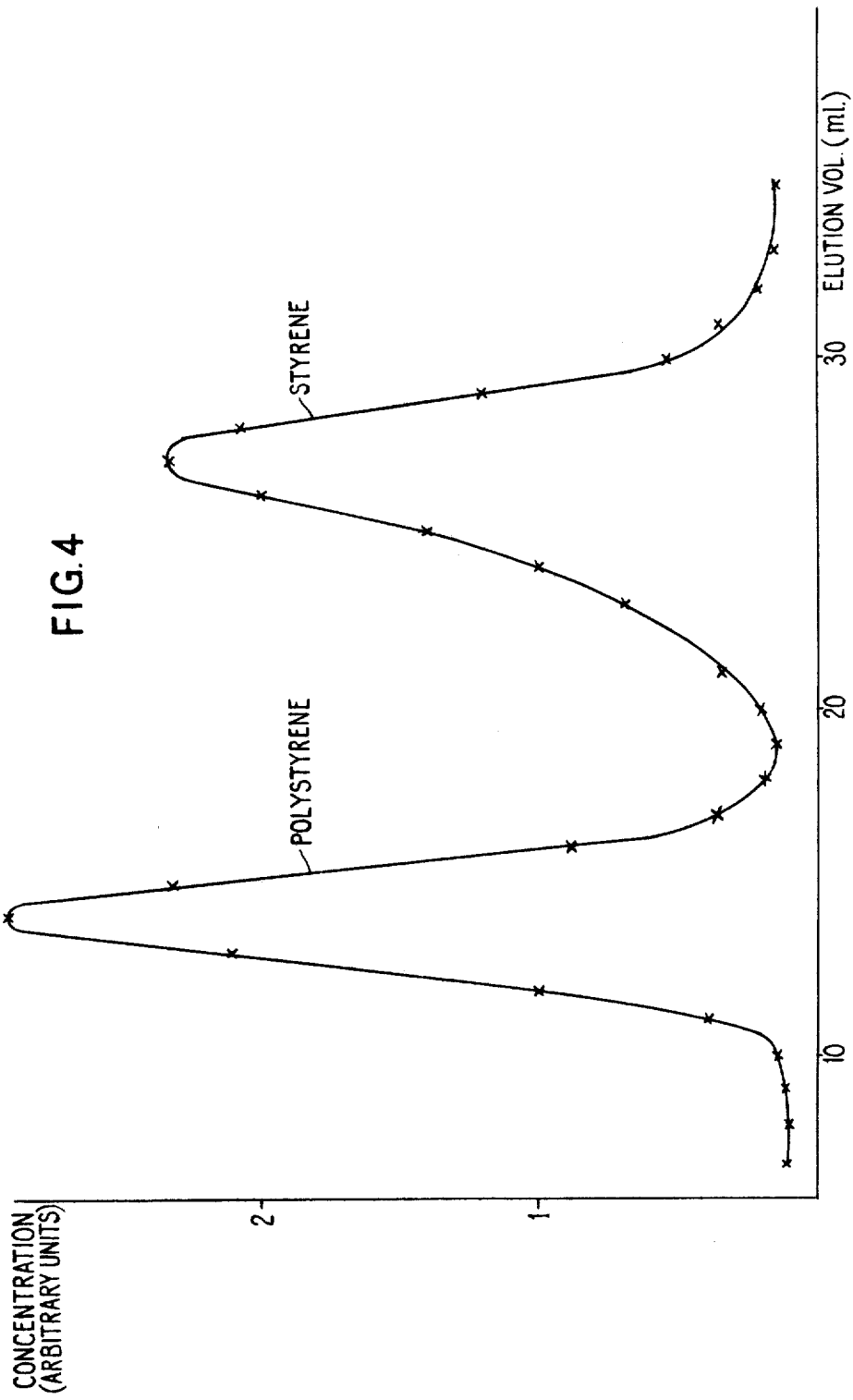

Polystyrene (0.5 percent) and styrene (0.005 percent) (sample volume 0.2 ml) were run on Column C3 collecting 1 ml fractions. The results are presented in FIG. 4.

Example 7.

Immobilisation of urease by molecular entrapment in copolymers of N-acryloylmorpholine (I) and N,N'-methylenediacrylamide (II)

Two samples of crystalline urease (12.5 mg) were weighed into stoppered test tubes. To one tube a solution of acryloylmorpholine (0.617g, 0.004 mole) and N,N'-methylenediacrylamide (0.071g, 0.0005 mole) in phosphate buffer (0.025 m, pH 7.5, 5 ml) was added, when the enzyme dissolved. The second urease sample was similarly dissolved except that only 2.5 ml of buffer was used. Riboflavin (0.05 mg) was added to each tube after which nitrogen was blown over the surface of the liquid for 30 minutes. The tubes were then placed in a beaker of ice water and irradiated with a No.2 photoflood lamp, when polymerisation occurred. The polymers were left at 0° to 5° overnight in order to harden, after which they were broken by grinding in a mortar. After washing twice with phosphate buffer (0.025 mole, pH 7.5), twice with urea (150 mM) in the same buffer, and twice more with buffer, the polymers were finally resuspended in buffer (15 ml) and stored at 0° to 5°C.

The activity of the immobilised urease derivatives were 333 units/g and 78 units/g for the 2.5 ml volume and 5 ml volume polymerisation respectively. (One urease unit being that which liberated 1 mg NH₃/h from a solution of 0.15M urea at pH 7.5 and 30°C.)

Example 8

This example illustrates the preparation on a pilot scale of a gel ($K_2$) comprising a polymer according to the invention. To a 20 l polymerisation flask, fitted with a large paddle stirrer, was added 10 l of liquid paraffin (light grade, wt per ml + 0.83 − 0.87 g) and 300 mls of a surfactant mixture. (900 mls of Span 85 + 20 mls of Tween 85). This was then degassed with nitrogen for 3½hours, by bubbling nitrogen through the mixture whilst stirring continually at about 100 r.p.m. After this period of time the nitrogen inlet was lifted above the surface of the liquid to maintain a nitrogen atmosphere. Acryloyl morpholine (1,265 mls, 1.41 kg, 10 moles) and N,N'-methylenediacrylamide (154.17 g, 1 mole) were dissolved in water 3.7 l) and degassed with nitrogen whilst stirring moderately rapidly for 2 hours. After this time, a solution of potassium persulphate in water (300 mls of a 50g/ 1 soln) previously degassed with nitrogen was added rapidly with stirring to the solution of monomers. The resulting aqueous mixture was immediately added to the paraffin in the flask, and after a brief period (about 30 seconds) of rapid stirring rate was decreased to a speed just sufficient (30 rpm) to maintain the aqueous phase in suspension. Small samples were removed at about 15 minute intervals and examined under the microscope to ascertain the degree of dispersion and to follow the polymerisation. After allowing the polymer to stand overnight, a substantial proportion of the liquid paraffin was decanted off, and the beads washed with 40°–60° petroleum spirit (4 × 5 l) and acetone (4 × 5 l). The beads were then dispersed with rapid stirring in water, and fine particles removed by elutriation. The remaining beads were suspended in the minimum amount of water, and shrunk by dropwise addition of absolute ethanol, (denatured with methanol). The ethanol was added slowly, otherwise "clumping" resulted. When the beads were completely free of water, they were washed three times with ether, and dried under reduced pressure at 50°C. The dry beads were sieved through a series of sieves (British Standards No.410/3) of mesh numbers 50, 100, 200 and 400.

Example 9

This example illustrates the preparation on a pilot scale of a gel ($K_1$) comprising a polymer according to the invention.

The procedure was the same as in Example 8: the monomers were dissolved in water (2.1 l) and after degassing with nitrogen and addition of the solution of potassium persulphate (300 mls of a 50 g/l soln.) the aqueous phase was poured into 10 l of paraffin containing 600 mls of a surfactant mixture (800 mls. of Span 85 + 120 mls of Tween 85). The rest of the procedure was as in Example 8.

Example 10

This example provides a comparison between different solutes subjected to elution in a column containing the polymer of the invention as chromedia. The parameter Kd indicates the behaviour of substances in elution and its value is determined by the molecular dimensions of the substance being studied. Kd can be represented by the following equation:

$$Kd = Ve - Vo/Vs - Vo$$

in which Ve represents the elution volume of the solute under test Vo represents the volume of the totally excluded solute (i.e., one which does not enter the inner volume), and Vs represents the elution volume of a molecule of solvent. Kd is completely characteristic of the solute and chromedium under test. The solvent must be specified but Kd is independent of flow rate and column dimensions.

It is clear from the above equation that if a solute is completely included, Ve=Vs and thus Kd=1. However, for a completely excluded solvent Ve=Vo and Kd=0. It should be noted that for an absorbed solute, in other words, one interferring with the normal chromatographic mechanism Kd is often greater than one.

The following tables indicate the Kd parameters for various solutes and illustrate the usefulness of the polymers of the invention for separating a wide range of solutes in gel permeation chromatography.

TABLE 3

| SOLUTE | Kd | SOLUTE | Kd |
|---|---|---|---|
| Glucose | .727 | Formaldehyde | .918 |
| Maltose | .667 | Ethylene glycol | .869 |
| Raffinose | .568 | Diethylene glycol | .781 |
| Stachyose | .508 | Triethylene glycol | .710 |
| Isomaltotetraose | .492 | Polyethylene glycol (Molecular weight 200) | .612 |
| Maltohexaose | .478 | Polyethylene glycol (Molecular weight) 400 | .497 |
| | | Polyethylene glycol (Molecular weight) 600 | .388 |
| | | Polyethylene glycol (Molecular weight) 750 | .322 |
| | | Polyethylene glycol (Molecular weight) 1,000 | .262 |
| | | Polyethylene glycol (Molecular weight) 1,500 | .224 |
| | | Polyethylene glycol (Molecular weight) 4,000 | .137 |

The above table No.3 gives the Kd values of various solutes, using gel permeation chromatography employing the gel $K_1$ comprising a polymer of the invention and using water as solvent. The solvent regain was 1.7 cm³ g⁻¹ dry chromedia. (The solvent regain is a measure of the porosity of a gel for a particular solvent and represents the number of grams of solvent taken up by 1 gram of xerogel during swelling).

TABLE 4

| SOLUTE | Kd | SOLUTE | Kd |
|---|---|---|---|
| PS 2,100 | .086 | Nitromethane | 1.108 |
| PS 600 | .273 | Nitrobenzene | .784 |
| Styrene | .647 | m-Dinitrobenzene | 1.036 |
| Benzene | .705 | 1,3,5 Trinitrobenzene | 1.583 |
| Diphenyl | .583 | Pyridine | .748 |
| p-Terphenyl | .504 | Polyethylene glycol (Molecular weight) 200 | .884 |
| p-Quaterphenyl | .432 | Polyethylene glycol | |

TABLE 4-Continued

| SOLUTE | Kd | SOLUTE | Kd |
|---|---|---|---|
| Naphthalene | .640 | Polyethylene glycol (Molecular weight) 400 | .535 |
| | | Polyethylene glycol (Molecular weight) 600 | .383 |
| Anthracene | .590 | Polyethylene glycol (Molecular weight) 750 | .330 |
| Pyrene | .590 | Polyethylene glycol (Molecular weight) 1,000 | .224 |
| Ferrocene | .626 | Polyethylene glycol (Molecular weight) 1,500 | .053 |
| Biferrocene | .496 | Polyethylene glycol (Molecular weight) 4,000 | 0 |
| Dichloromethane | .964 | | |

The above table No. 4 gives the Kd values for a range of solutes using gel permeation chromatography employing the gel $K_1$, and using chloroform as solvent. The solvent regain was 1.8 $cm^3$ $g^{-1}$ dry chromedia.

TABLE 5

| SOLUTE | Kd | SOLUTE | Kd |
|---|---|---|---|
| PS 600 | .050 | Nitromethane | 1.40 |
| Styrene | .750 | Nitrobenzene | .975 |
| Benzene | .825 | m-Dinitrobenzene | 1.25 |
| Diphenyl | .750 | 1,3,5, Trinitrobenzene | 1.60 |
| p-Terphenyl | .650 | Pyridine | 1.225 |
| p-Quaterphenyl | .650 | Polyethylene glycol (moleculare weight) 400 | 3.15 |
| Naphthalene | .825 | Polyethylene glycol (Molecular weight) 600 | 2.00 |
| Anthracene | .775 | Polyethylene glycol (Molecular weight) 1,000 | 1.00 |
| Pyrene | .825 | Polyethylene glycol (Molecular weight) 1,500 | 0.40 |
| Ferrocene | .80 | Polyethylene glycol (Molecular weight) 4000 | 0 |
| Biferrocene | .65 | | |

The above table No. 3 gives the Kd values for a range of solutes employing the gel $K_1$, and using tetrahydrofuran as solvent. The solvent regain was 1.3 $cm^3 g^{-1}$ dry chromedia.

It should be noted that the polyethylene glycol solutes adsorbed slightly in the tetrahydrofuran solvent.

Example 11.

As mentioned earlier the solvent regain is a measure of the porosity of a gel and is the number of grams of solvent taken up by 1 gram of xerogel during swelling. One advantage of the invention is that the polymers swell in water and in organic solvents such as pyridine and chloroform and this feature is illustrated in the following table 6, giving the solvent regain for a variety of solvents. The table clearly shows that the polymers do not readily swell in ethanol or methanol and this property is useful for facilitating recovery and drying.

TABLE 6

Solvent regain of cross-linked poly(acryloylmprpholine) beads

| | Gel $K_1$ | Gel $K_2$ |
|---|---|---|
| Water | 1.7 ml/g | 2.4 ml/g |
| Methanol | 0.8 ml/g | 1.3 ml/g |
| Ethanol | 0.7 ml/g | 1.1 ml/g |
| DMF | 1.5 ml/g | 2.6 ml/g |
| Chloroform | 1.8 ml/g | 2.6 ml/g |
| Methylene dichloride | 1.7 ml/g | 2.3 ml/g |
| Tetrahydrofuran | 1.3 ml/g | 1.8 ml/g |
| Benzene | 0.4 ml/g | 0.4 ml/g |
| pet ether | nil | nil |
| carbontetrachloride | nil | nil |
| pyridine | 1.9 ml/g | 2.7 ml/g |
| morpholine | 1.0 ml/g | 1.4 ml/g |

Example 12

Separation of species of different molecular weight by gel permeation chromatography using gels $K_1$ and $K_2$.

The gels were packed into chromatographic columns of varying dimensions. Using a variety of solvents as eluent the following chromatograms were run.

Figure 5:
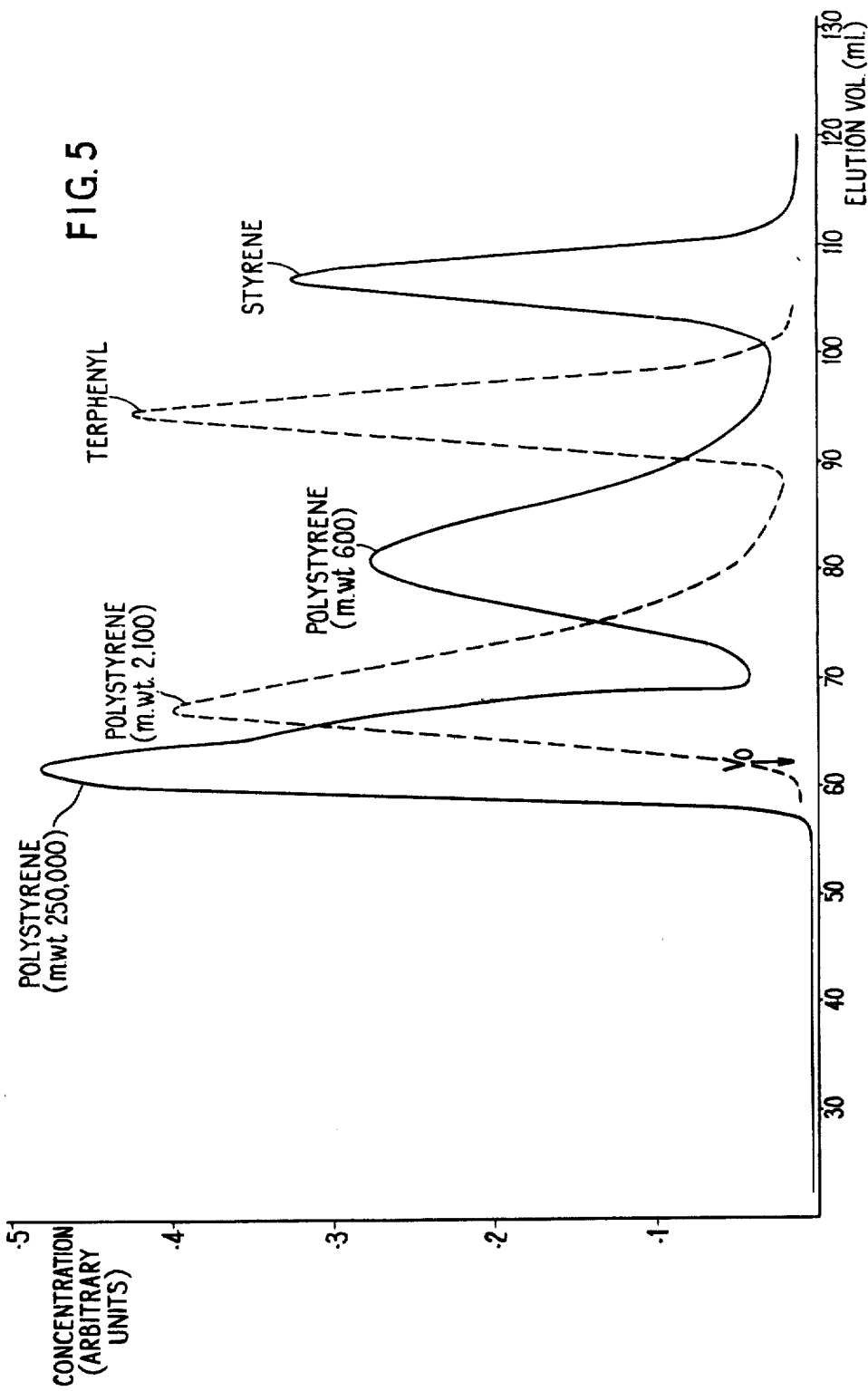

Chromatogram 6 (FIG. 5)

A sample (2.5ml, 1 percent solution) of styrene terphenyl, polystyrene (molecular weight 250,000), polystyrene (molecular weight 2,100) and polystyrene (molecular weight 600) were run on a column with the dimensions 89 × 1.5 cm. The flow rate was 40 ml/h and the solvent was chloroform. The gel used was $K_1$. The results are shown in FIG. 5 (The continuous and dotted lines indicate separate runs). As can be seen the column effectively separated the components.

The run was repeated with a similar column using gel $K_2$ and a flow rate of 35 ml/h. Equally successful results were obtained.

Figure 6:
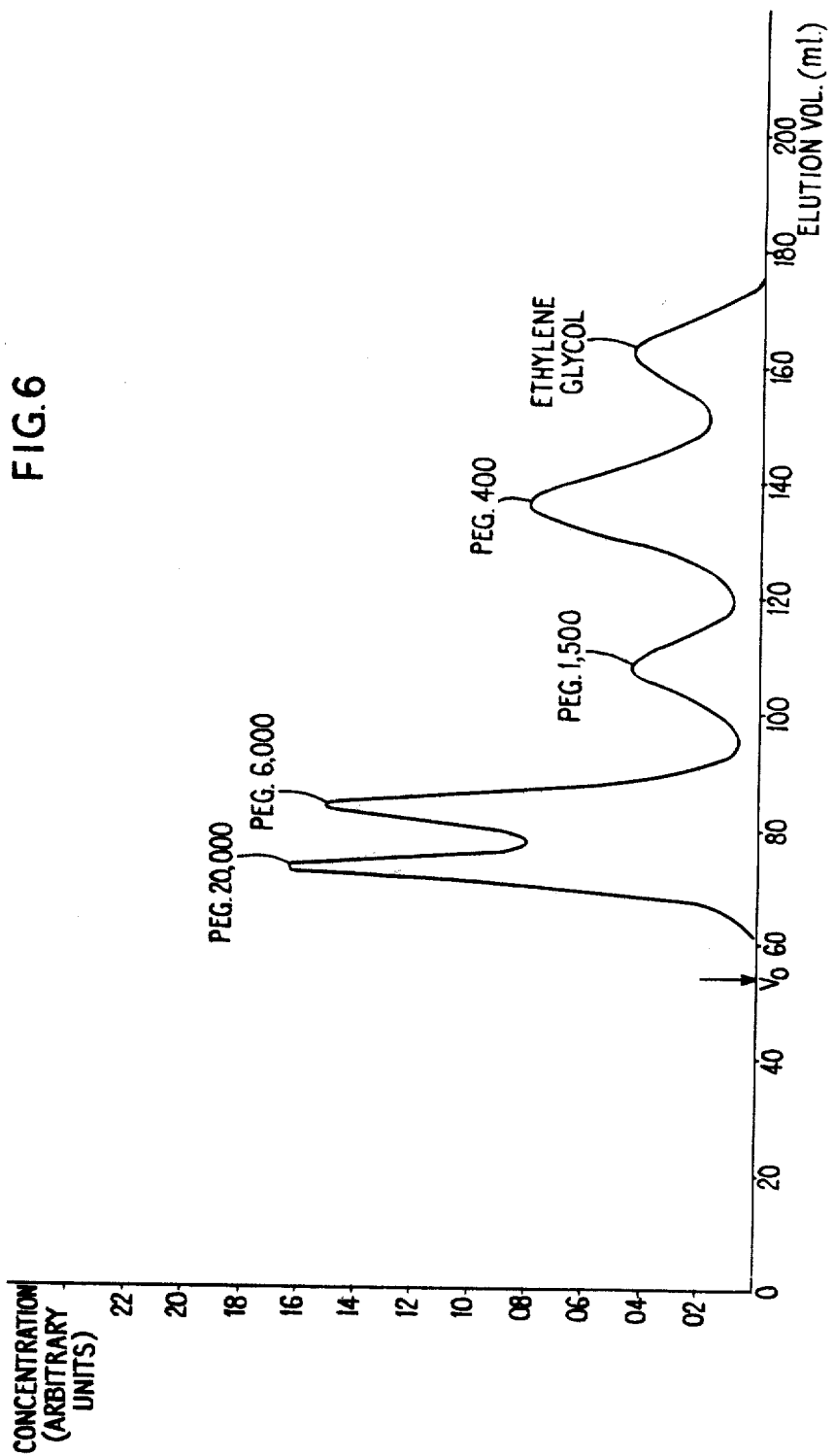

Chromatogram 7 (FIG. 6)

A sample containing polyethylene glycol (molecular weight 1,500) polyethylene glycol (molecular weight 400), and ethylene glycol were run on a column with the dimensions 36.5 × 2.5 cm. Gel $K_2$ was used and the water region was 2–5 ml/g. The results are shown in FIG. 6 and as shown the column effectively separated the components. An equally successful separation was obtained using the same column packed with gel $K_1$.

Figure 7:
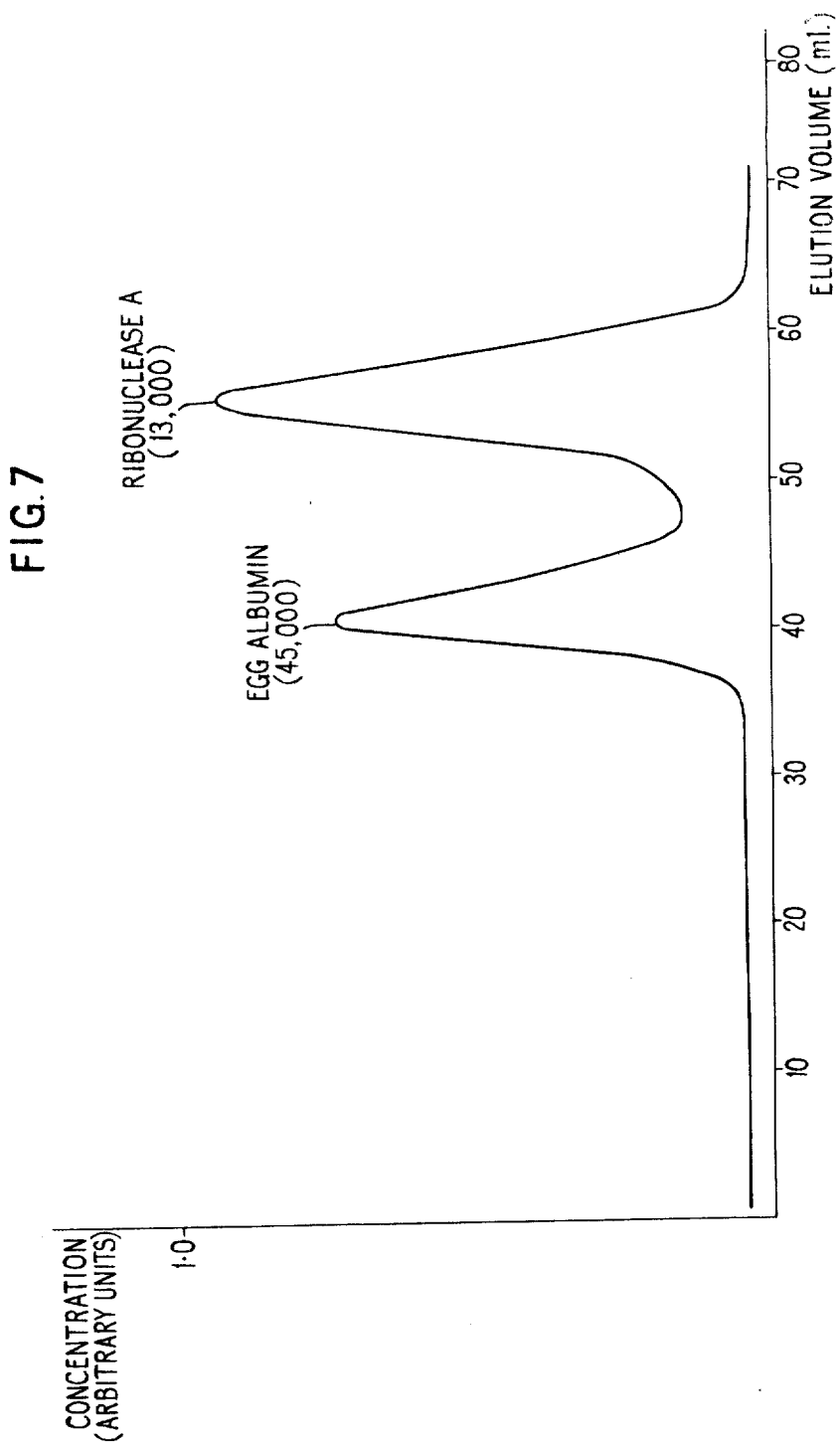

Chromatogram 8 (FIG. 7)

A sample (2 ml, 0.5 percent) comprising the proteins, egg albumin (0.5 percent) (molecular weight 45,000) and ribonuclease A (Molecular weight 13,000) were run on a column with the dimensions 30 × 2.5 cm. The solvent was 1 m Na Cl in 0.1 m Tris HCl, pH 8.0. The successful separation of the components was achieved as shown in FIG. 7.

Figure 8:
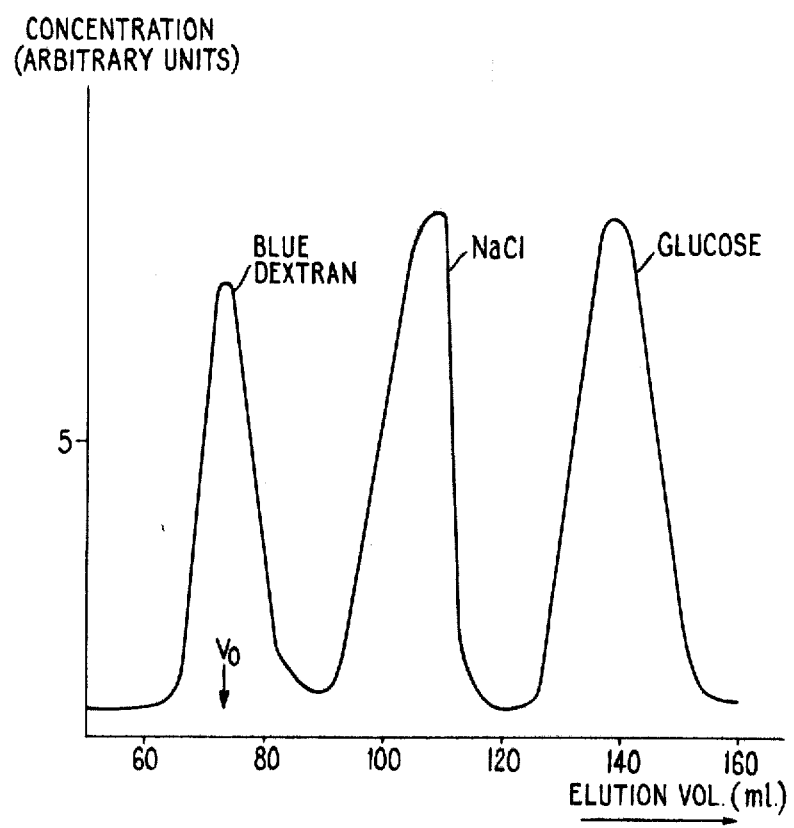

Chromatogram 9 (FIG. 8)

This illustrates the desalting of small molecules with gel $K_1$. A sample (2 ml, 1 percent solution) of blue dextran, NaCl, and glucose was run on a column with the dimensions 36 × 2.5 cm at a flow rate of 8 ml/h. The results are given in FIG. 8. Using the formula given previously the Kd value for NaCl was estimated as 0.54.

The run was repeated using mixtures of HCl, LiCl, NaBr, KCl, $mgCl_2$ $Na_2$ $So_4$, $NaH_2$ $PO_4$, $Na_2HPO_4$ and $NA_2$ $(Fe(CN)_5NO)$ with blue dextran and glucose. Similar profiles to that shown in FIG. 8 were obtained showing the polymer application of the invention successful for the desalting of small molecules.

As can be seen from the preceding examples the compounds according to the invention can be readily used as the stationary phase in gel permeation chromatography, as well as for other uses such as for the entrapment of biologically active molecules.

We claim:

1. A cross-linked polymer having repeating units in the backbone chains, at least some of the repeating units of the backbone chains having morpholine groups covalently bonded through the nitrogen atom of the morpholine groups through divalent linking groups to the atoms constituting the backbone chains, said repeating morpholine units having morpholine groups selected from the group consisting of

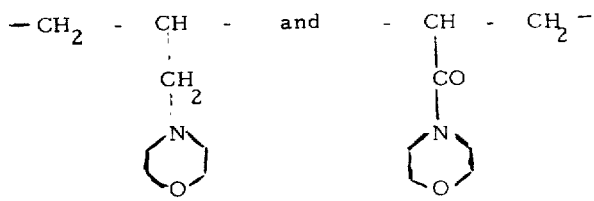

said polymer further characterized in having cross-links between said backbone chains formed by copolymerized diethylenically unsaturated monomers, the molar ratio of said diethylenically unsaturated monomers to the other monomers in the polymer being from 1:150 to 1:1.5 so that sufficient cross-links exist between the backbone chains to make the polymer capable of forming a gel in water or chloroform.

2. A polymer as claimed in claim 1 in which the divalent organic radicals are methylene bridges or carbonyl groups.

3. A polymer as claimed in claim 1 in which the backbone chains consists essentially of saturated carbon - carbon links.

4. A polymer as claimed in claim 1 in which the cross-links extending between the atoms of the backbone chains have the formula,

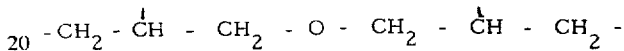

5. A polymer as claimed in claim 1 in which the cross-links extending between the atoms of the backbone chains have the formula:

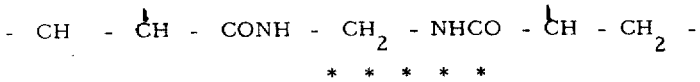

* * * * *

UNITED STATES PATENT OFFICE
CERTIFICATE OF CORRECTION

PATENT NO. : 3,896,092
DATED : July 22, 1975
INVENTOR(S) : Roger Epton; Christopher Holloway; John McLaren It is certified that error appears in the above–identified patent and that said Letters Patent are hereby corrected as shown below:

Please indicate the assignee of this patent to be

KOCH-LIGHT LABORATORIES LIMITED.

Signed and Sealed this twenty-seventh Day of January 1976

[SEAL]

Attest:

RUTH C. MASON
Attesting Officer

C. MARSHALL DANN
Commissioner of Patents and Trademarks